(12) United States Patent
Waddell, V et al.

(10) Patent No.: US 7,523,516 B1
(45) Date of Patent: Apr. 28, 2009

(54) EXTENDED WATER ESCAPE RAMP DEVICE FOR ANIMALS

(75) Inventors: James Madison Waddell, V, Mt. Pleasant, SC (US); Thomas Moore Davis, Mt. Pleasant, SC (US); Carolyn Walker Agnew, Charleston, SC (US); Virginia Camp Wier Waddell, Mt. Pleasant, SC (US)

(73) Assignee: Skamper Industries LLC, Mt. Pleasant, SC (US)

( * ) Notice: Subject to any disclaimer, the term of this patent is extended or adjusted under 35 U.S.C. 154(b) by 0 days.

(21) Appl. No.: 12/074,004

(22) Filed: Feb. 29, 2008

(51) Int. Cl.
*E01D 1/00* (2006.01)

(52) U.S. Cl. .................... 14/69.5; 119/847; 119/849
(58) Field of Classification Search ................. 14/69.5; 119/847, 849
See application file for complete search history.

(56) References Cited

U.S. PATENT DOCUMENTS

| | | | |
|---|---|---|---|
| 3,891,053 | A | 6/1975 | Burton |
| 4,285,514 | A * | 8/1981 | Romero ...................... 472/89 |
| 4,615,464 | A | 10/1986 | Byrns |
| 4,630,709 | A | 12/1986 | Taylor |
| 4,893,363 | A | 1/1990 | Huff |
| 4,907,674 | A | 3/1990 | Miller |
| 4,972,540 | A | 11/1990 | Phelps |
| 5,288,453 | A | 2/1994 | Rutenbeck et al. |
| D346,256 | S | 4/1994 | Thomas, III et al. |
| 5,301,630 | A | 4/1994 | Genovese et al. |
| 5,333,323 | A | 8/1994 | Aymes |
| 5,829,380 | A | 11/1998 | Smith |
| D404,143 | S | 1/1999 | Grey, Jr. |
| D412,224 | S | 7/1999 | Adler |
| 6,237,166 | B1 | 5/2001 | Stalfire |
| 6,248,441 | B1 | 6/2001 | Anderson et al. |
| 6,321,689 | B1 | 11/2001 | Fulmer |
| 6,348,173 | B1 | 2/2002 | Anderson |
| 6,422,386 | B1 | 7/2002 | Wiese et al. |
| 6,569,276 | B2 | 5/2003 | Anderson et al. |
| 6,643,879 | B1 | 11/2003 | Davis |
| 6,659,276 | B2 | 12/2003 | Anderson et al. |
| 6,793,074 | B2 | 9/2004 | Anderson et al. |
| 6,983,720 | B2 * | 1/2006 | Lakela ........................ 119/165 |

(Continued)

OTHER PUBLICATIONS www.skamper-ramp.com.

(Continued)

*Primary Examiner*—Gary S Hartmann

(57) ABSTRACT

An extended ramp device for helping animals to escape from a body of water includes: (a) a substantially planar upper, support portion including a central, climbing member and two bendable wing members connected to opposite sides of the central climbing member, each of the wing members including a substantially straight upper edge, an arched lower edge, a substantially straight, angled side edge at a front of the wing member, and at least two substantially keyhole-shaped slots; (b) a substantially planar lower, extension portion, the upper, support portion and the lower, extension portion including toehold perforations; (c) at least two brace members, each including a male end connecting projection on each opposite end, each of the brace male end connecting projections being insertable in the two substantially keyhole-shaped slots; and (d) a mechanism for removably attaching the extended ramp device to a structure adjacent or in the body of water; wherein the extended ramp device includes a disassembled position for transport, and an assembled position for use in the body of water.

20 Claims, 11 Drawing Sheets

U.S. PATENT DOCUMENTS

| | | |
|---|---|---|
| 6,988,633 B2 | 1/2006 | Grinnall et al. |
| 7,021,920 B2 | 4/2006 | Rutenbeck et al. |
| 7,141,202 B2 | 11/2006 | Rutenbeck et al. |
| 7,182,905 B2 | 2/2007 | Grinnall et al. |
| 7,229,587 B2 | 6/2007 | Anderson et al. |
| 2005/0075177 A1* | 4/2005 | Bork et al. .................... 472/89 |
| 2006/0073290 A1 | 4/2006 | Bahnsen et al. |
| 2006/0228943 A1 | 10/2006 | Grinnall |
| 2007/0012704 A1 | 1/2007 | Grinnall et al. |

OTHER PUBLICATIONS www.custom-pak.com.
www.doggydocks.com.
www.pawsaboard.com.
www.poolpup.com.
www.petstep.com.

\* cited by examiner

EXTENDED WATER ESCAPE RAMP DEVICE FOR ANIMALS

BACKGROUND OF THE INVENTION

1. Technical Field

The present invention is an extended ramp device for assisting pets and other small animals to escape from a swimming pool, lake, or other body of water, more particularly a compact, assembleable water escape ramp device with an extended ramp that may be collapsible and that includes either attached, foldable wing members or separate, snap-on wing members.

2. Background Information

Swimming pool owners and workers often find, to their sad regret, that a pet or wild animal has drowned after jumping or falling into an unattended outdoor or indoor swimming pool. Family or stray pets, such as dogs and cats, and wild animals, including rats, opossums, squirrels, and raccoons, and a wide variety of large and small insects, are too often found drowned in the family, club or municipal pool, because the animals were unable to locate or climb the pool steps or ladder, or to climb the smooth, vertical sides of the swimming pool. In addition to the physical and/or emotional pain suffered by the pet, its owner, and any bystanders, there is the unpleasant task of removing the remains of the domestic or wild animal from the pool. Since the animal's body may have contaminated the pool, the pool must be decontaminated, which often means incurring the expense of costly chemicals and/or draining and refilling the pool.

The present invention is an extended ramp device that can help animals trapped in a swimming pool or the like to escape when no human is present to extricate them. U.S. Pat. No. 6,643,879, Thomas M. Davis, issued Nov. 11, 2003 also describes an animal water escape ramp device. With the extended ramp device of the invention, the owner of the pool or the like need not incur the expense of reconstructing or redesigning the swimming pool, and there is no damage to the swimming pool or other body of water. The present invention is a buoyant extended ramp device for removable attachment to the deck or wall of a swimming pool or other body of water. The extended ramp device is inexpensive and easy to install, use, and remove. The extended ramp device of the present invention provides a long surface for the animal to mount, permitting even heavy small animals to utilize the ramp device.

BRIEF SUMMARY OF THE INVENTION

An extended ramp device for assisting animals in escaping a swimming pool, or another man-made or natural body of water, includes: (a) a substantially planar upper, support portion comprising a central, climbing member and two wing members, each of the wing members being bendable along a substantially straight upper edge of the wing member, each of the wing members further comprising an arched lower edge opposite the substantially straight upper edge and at least two substantially keyhole-shaped slots, the flexible wing members being connected to opposite sides of the central climbing member, each of the wing members further comprising a substantially straight, angled side edge at a front of the wing member; (b) a substantially planar lower, extension portion, the upper, support portion and the lower, extension portion comprising a plurality of toehold perforations; (c) at least two brace members, each of the brace members comprising a male end connecting projection on each opposite end of the brace member, each of the brace male end connecting projections being insertable in the at least two substantially keyhole-shaped slots; and (d) a mechanism for removably attaching the extended ramp device to a structure adjacent or in the body of water; wherein the extended ramp device comprises a disassembled position comprising the separate (a)-(c) components, and an assembled position for use in the body of water. A flexible bib with a slot for a cleat may be attached to the upper edge of the central, climbing member.

The invention includes a collapsible extended ramp device with a lower, extended ramp portion that slides over the lower surface of the upper, support portion and locks for transportation and storage. The collapsible extended ramp device can also be used in the collapsed position for helping lighter weight animals to escape from a body of water.

The invention also includes an extended ramp device with separate wing members. Wing gutters in the separate wing members of the separate wing extended ramp device clasp over ramp guideways on the opposite side edges of the upper, support portion. The brace members lock the extended ramp device in place so that it is ready for use.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
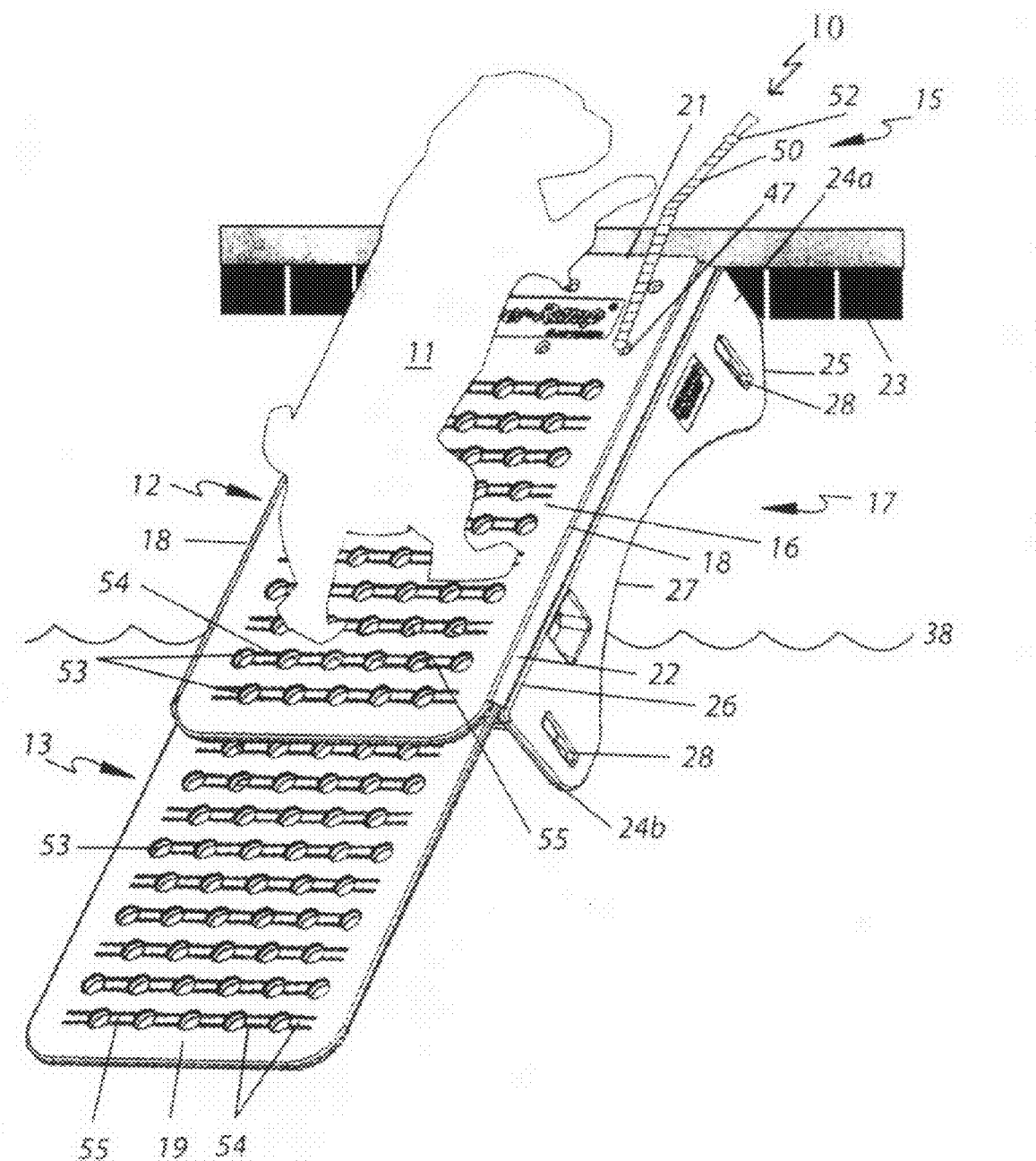
FIG. 1 is a perspective view of an extended ramp device according to the present invention, showing the assembled ramp device in use by a dog.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 2:
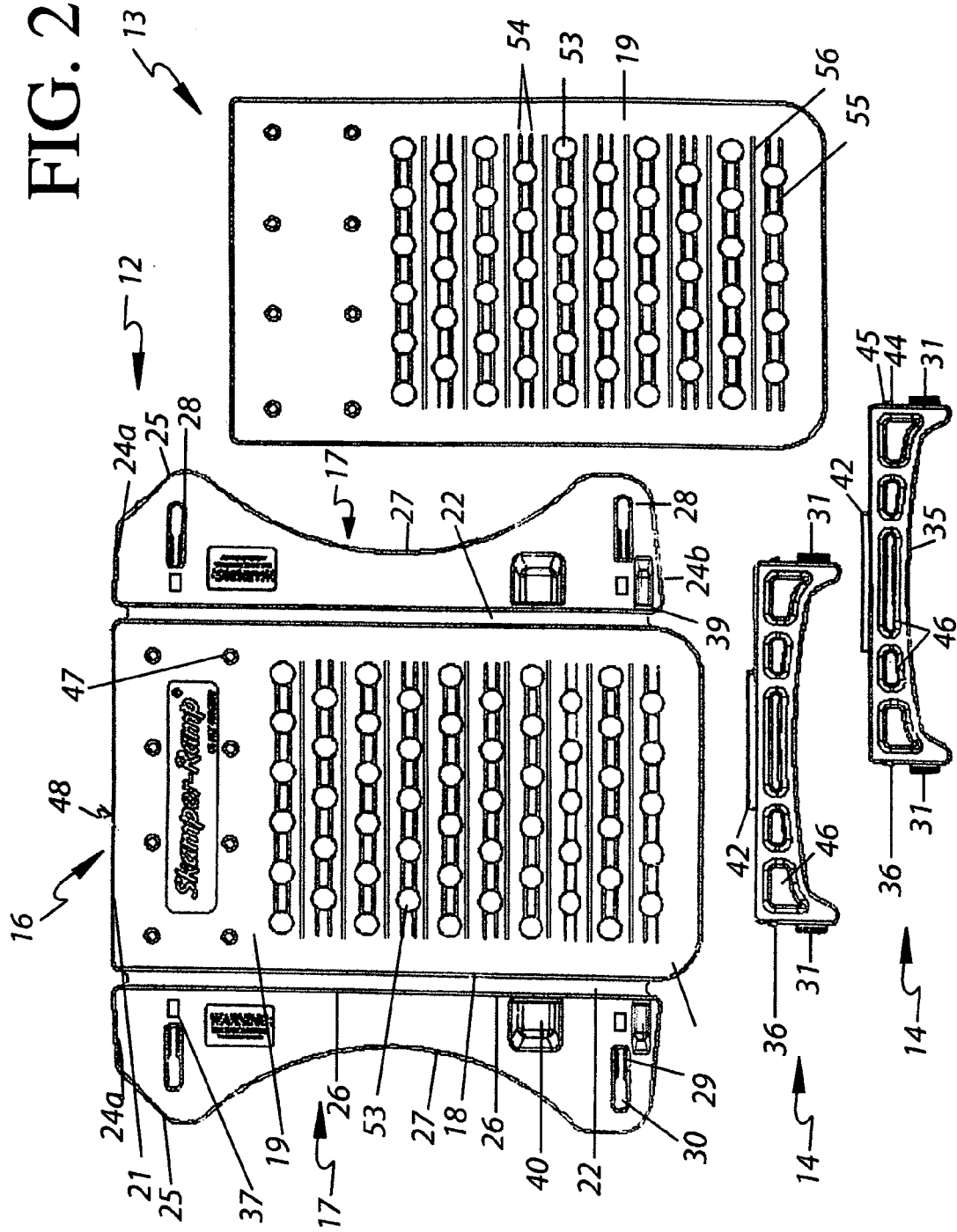
FIG. 2 is an elevational view of an unassembled ramp device according to the present invention, showing the top of the ramp device.

Referring to FIGS. 1 and 2, an extended ramp device, generally referred to herein as 10, can assist small animals 11 to escape from, or otherwise exit, a swimming pool, lake, in-ground or above-ground tub, canal, bulkhead, reservoir, water trough, pond, or another man-made or natural body of water. No contemporaneous human assistance is required for an animal to exit a body of water using the ramp device 10. The ramp device 10 includes an upper, support portion 12, a lower, extension portion 13, and at least two, and preferably two, brace members 14. The upper, support portion 12 can be used on its own as an escape device, since it includes a central ramp section. The lower, extension portion 13 is preferably attached to the upper, support portion 12, though, prior to use. The lower, extension portion 13 permits the extended ramp device 10 to be utilized by heavier animals without the ramp device sinking down a great deal, or tipping over. The lower, extension portion 13 is also helpful where the distance from the water's surface 38 to a deck, land, etc. is more than about 18 inches.

A fastening mechanism 15 is included for removably attaching the extended ramp device 10 next to the body of water in which the ramp device is floating. The extended ramp device 10 is preferably tied to a structure, such as the side of a pool 23, canal, in-ground tub, walled pond, dock 63, ramp, platform, or ladder adjacent a body of water, or to a houseboat or other type of boat or raft, or any other appropriate structure. The extended ramp device 10 has a compact, unassembled position for transport and storage, and an assembled position for use. No tools or special skills are required for assembling the extended ramp device 10.

The upper, support portion 12 includes a central, climbing member 16 and two generally mirror image wing members 17. The wing members 17 are each movably affixed to an opposite, substantially straight long side 18 of the central, climbing member 12. The central climbing member 16 and the lower, extension portion 13 are each generally rectangular sections with substantially planar upper and lower surfaces 19, 20.

The central, climbing member 16 and the lower, extension portion 13 preferably each have the same dimensions as one another. The central, climbing member 16 and the lower extension portion 13 are preferably the same width so that the upper section of the lower extension portion 13 fits flat against the central climbing portion 16 and closely between the two wing members 17 when the lower, extension portion 13 is attached to the rest of the ramp device. The central climbing member 16 and the lower, extension portion 13 preferably are about the same length in order to facilitate storage in a box or other container, although the lower, extension portion 13 can be shorter or longer than the central climbing portion 16.

As seen in FIG. 1, the upper edge 21 of the central, climbing member 16 is substantially straight for even contact when the extended ramp device 10 bumps against the relatively straight walls 23 of a pool, dock 63, walled pond, houseboat, reservoir, water tank, trough, or any other suitable structure. The extended ramp device 10 normally bobs around on waves that occur in the body of water, periodically contacting the adjacent wall. As the animal 11 mounts the extended ramp device 10, the ramp device remains relatively stable, in part because of the substantially straight upper edge 21.

When it is deployed, the extended ramp device 10 floats at about a 20 to about a 60 degree angle in the water, as seen in FIG. 1, though the angle of repose can vary at times with wave motion in the body of water, etc. The angle of float repose is more preferably between about 30 and about 50 degrees. The lower surfaces 20 of the floating upper and lower portions 12, 13 face generally down toward the bottom of the body of water, and the upper surfaces 19 on which the animal climbs face generally upward toward the water's surface 38, the sky, and/or the ceiling (e.g., for an indoor pool). Since the extended ramp device 10 is normally tied or otherwise fastened to the side of the pool, dock, boat, etc., the extended ramp device 10 floats with its top section up out of the water. As seen in FIG. 1, most of the extended ramp device 10 is submerged in the water when it is in use, though, particularly when an animal is mounting it. The ability of the floating ramp device to stay at an acceptable angle (as close to about 30-50 degrees as possible) is important because a long, floating object has a tendency to go vertical when mounted by a heavy dog, for example. If it was to go vertical, the dog would have great difficulty climbing it and would likely fall off, particularly an arthritic or infirm dog.

In the unassembled position shown in FIG. 2, the pieces of the extended ramp device 10 are relatively flat and fit compactly into a box or other container. In the unassembled position, the ramp device 10 comprises four pieces: the upper, support portion 12, the lower, extension portion 13, and the two brace members 14. The device fastening mechanism 15 can remain attached to the upper, support portion 12 for storage, or it can be detached, as desired. The pieces preferably snap together. No tools, nuts or bolts are required for assembly. There are preferably no loose parts in the ramp device kit to confuse the consumer, which is ideal for the unskilled consumer. Even though the pieces of the kit easily snap together, the extended ramp device 10 does not break apart during use, even under the weight of a heavy dog.

The upper and lower portions 12, 13 of the extended ramp device 10 and the brace members 14 are preferably made by a molding and/or extrusion process using the same buoyant, water-resistant material, which is preferably plastic. Although the upper and lower portions 12, 13 and the brace members 14 are preferably made by blow molding, they can also be made by twin sheeting, thermoforming and gluing or spot welding, extruding, or injection molding.

The upper, support portion 12 is preferably one-piece and made of a buoyant polyethylene or polypropylene material. The bendable wing members 17 are bent down along the two long sides 18 of the central climbing member 16 during assembly of the extended ramp device 10. As seen in FIG. 2, a narrow, flexible strip 22 preferably extends between each wing member 17 and the corresponding long side 18 of the substantially rectangular-shaped central climbing member 16. The wing members 17 are both bent down along their respective flexible strips 22 once the upper, support portion 12 has been removed from its packaging. When the extended ramp device 10 is assembled as described herein, the wing members 17 are each preferably fixed at about a 75 to about a 90 degree angle relative to the central, climbing member 16. The wing members 17 are more preferably each at an angle of between about 80 and about 89 degrees, and most preferably each at an angle of between about 84 and about 86 degrees, in relation to the transverse plane of the central, climbing member. The most preferred 84-86 degree angle has been found herein to minimize rocking of the extended ramp device 10 from side to side in the water. The bent wing members and the upper, support portion 12 that connects them would resemble a large, open staple, or an open ended rectangle, in plan view.

As seen in FIG. 2, the wing members 17 are shaped so as to optimize storage, assembly, and performance of the extended ramp device 10. In addition to having a substantially straight upper edge 26 adjacent the central, climbing member 16, each wing member 17 has two opposite wing end edges 24. The rear substantially straight wing end edge 24b, which is at the rear of the wing member, extends down at approximately a 90 degree angle relative to the upper edge 26 of the wing member 17. The front wing end edge 24a, though, is preferably just off perpendicular. Specifically, the front wing end edge 24a preferably extends down at an angle of between about 85 and about 95 degrees relative to the upper edge 26 of the wing member 17. It has been found that this 85-95 degree angle holds the extended ramp device at the more preferred approximately 30 degree angle when the rope is taut and the properly installed ramp device is braced against the pool wall or other structure.

Each wing member 17 also includes one angled side edge 25 at the front of the wing member. As seen in FIG. 2, the substantially straight angled side edge 25 of each wing member extends down and in at between about a 30 and about a 45 degree angle relative to the wing end edge 24a above it and to the upper edge 21 of the central, climbing member 16. This approximate 30-45 degree angle has been found herein to be important for maintaining the angle of the extended ramp device 10 and supporting the animal that is mounting the extended ramp device 10, as illustrated in FIG. 1. The angled side edges 25 contact the wall 23, or side, of the pool, dock, boat, etc. and lie substantially flat against the wall 23, as depicted in FIG. 1. The full contact by the angled side edges 25 acts to stabilize the extended ramp device 10 so that it is less likely to rock or wobble as the animal 11 mounts it. Thus, the likelihood that the animal will panic and fall or jump off the extended ramp device is lessened.

From the angled wing side edge 25, the wing member 17 curves into an arch 27 at the bottom of the wing member, as seen in FIGS. 1 and 2. In the preferred embodiment depicted in FIG. 2, each wing member 17 is narrowest at its midsection where the top of the arch 27 is only a few inches from the upper wing edge 26, and widest near the sides of the wing members 17. The widest point at the tops of the wing members are at the bottom of each angled wing side 25, and the widest point at the bottoms of the wing members occur at the base of the rear wing end edge 24b. By "tops" here is meant the upper ends of the wing members 17, which are closer to, and often above, the water's surface 38 when the extended ramp device 10 is floating in the water. By "bottoms" is meant the lower ends of the wing members, which are submerged farther down in the body of water when the ramp device is floating in the water.

Figure 3:
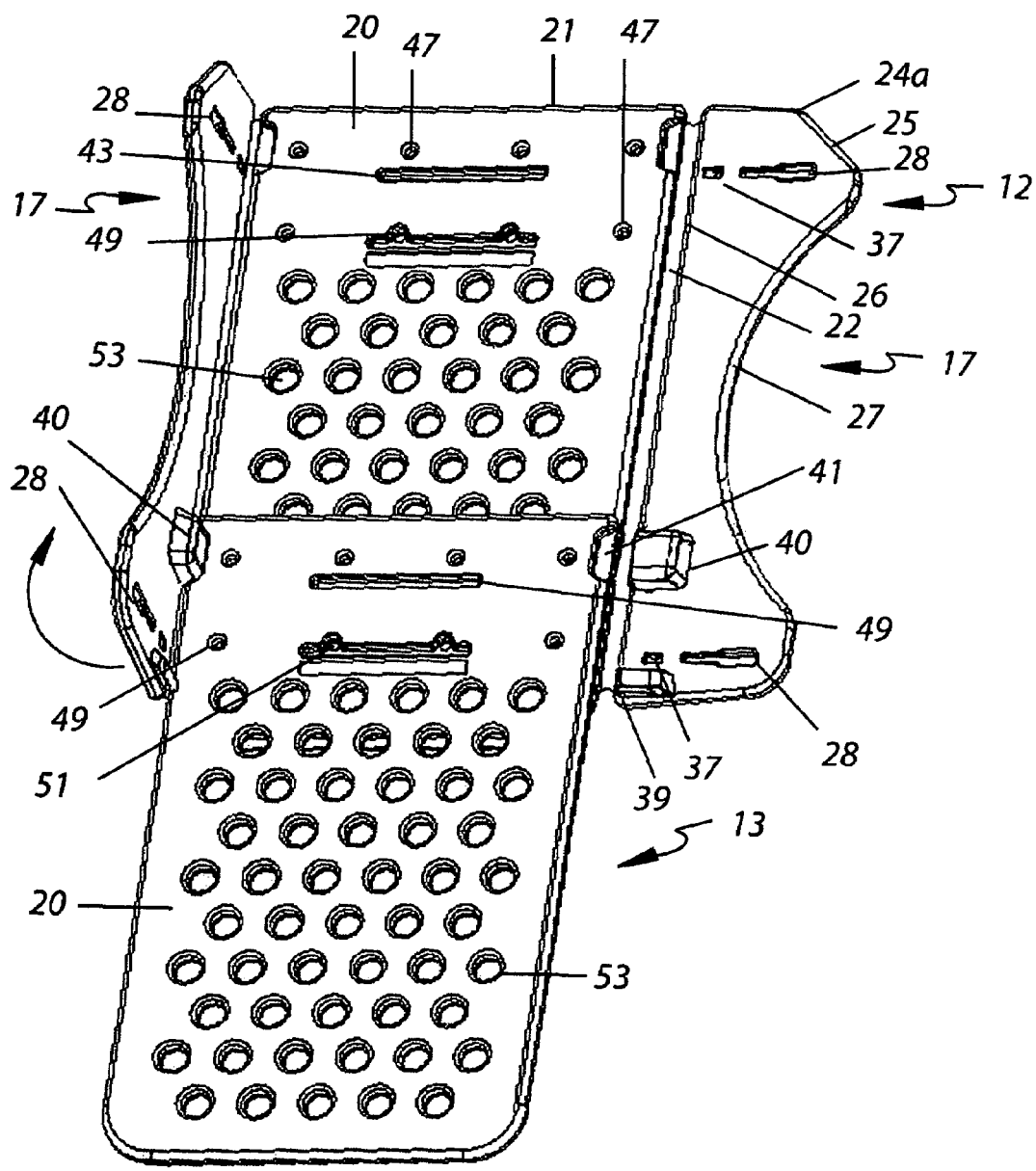
FIG. 3 is a perspective view of a partially assembled extended ramp device according to the present invention, showing the bottom of the ramp device.

As seen in the figures, the wing members 17 preferably include four interior features: two blocks 39, 40 and two slots 28 on each wing member. In regard to the first, optional feature on this preferred, blow-molded device 10, each wing member 17 includes an indentation on its upper surface 19 that is preferably generally square in shape. As seen in FIG. 3, the indentation extends through the opposite, lower surface, forming a similarly shaped male block 40 protruding from the opposite, lower surface 20 of the wing member. The male blocks 40 are at the rear of the wing members 17.

Figure 5:
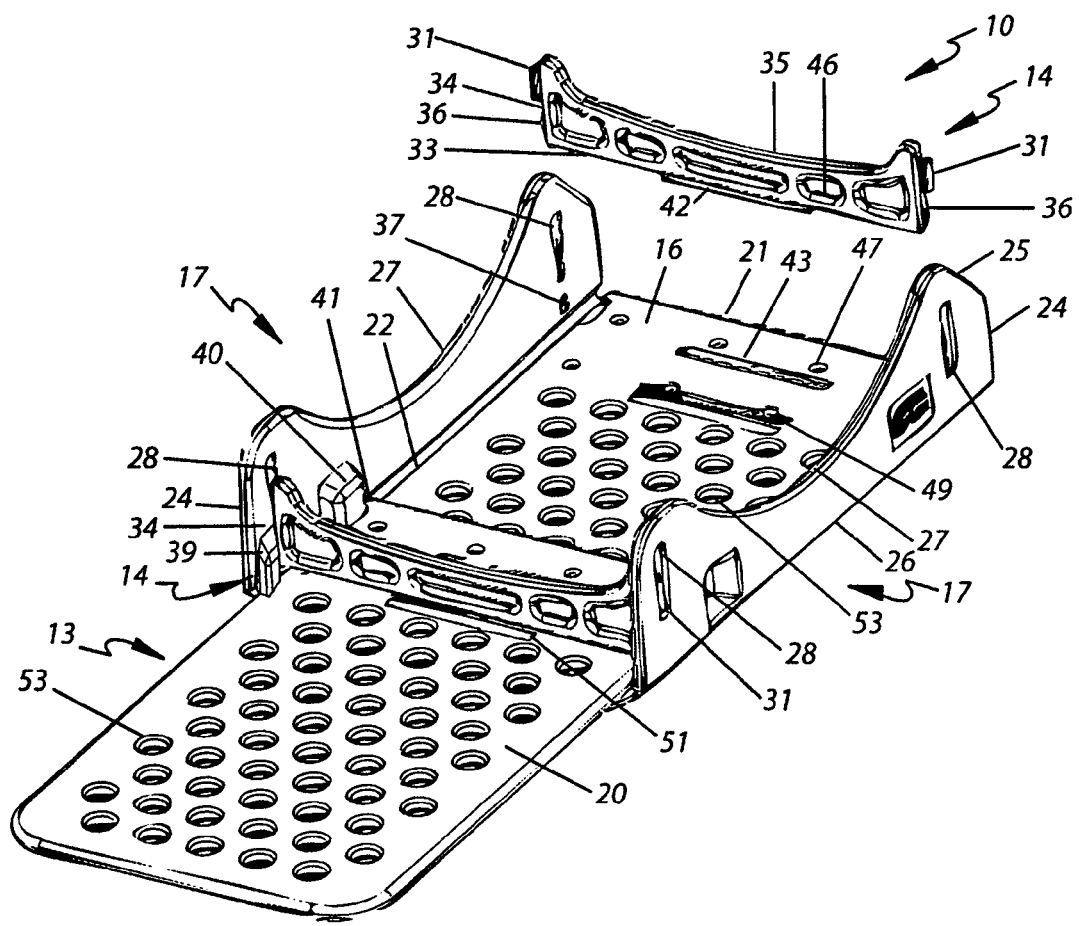
FIG. 5 is a bottom perspective view of a partially assembled extended ramp device according to the present invention.

As the extended ramp device 10 is assembled, the base of each wing male block 40 fits into a corresponding female ramp recess 41 in an upper end section of the lower extension portion 13, as illustrated in FIG. 3. The lower extension portion 13 has two ramp recesses 41 on its opposite sides near the upper edge of the lower extension portion 13. The two wing male blocks 40 in place in the two female ramp recesses 41 help to prevent the lower, extension portion 13 from sliding down and detaching from the rest of the extended ramp device 10. Once it is locked down as illustrated in FIG. 5, the rear (lowermost) brace member 14 helps to hold the lower, extension portion 13 in place.

The lower, extension portion 13 and the central climbing member 16 of the upper, support portion 12 are preferably made from the same mold for ease of manufacture and as a cost saving measure. A ramp recess can therefore be present in both the upper and lower portions 12, 13. The ramp recess 41 in the upper, support portion 12 is not intended to be used, though. The ramp recess 41 is useful/functional in the lower, extension portion 13, but "nonfunctional" in the upper, support portion 12. The same is true of other nonfunctional formations 49 in the upper or lower portions 12, 13, although indentations in the extended ramp device 10 are in general believed to be advantageous in that they add strength to the structure and increase surface area.

The second interior feature of the wing members 17 is the smaller wing block 39, which also helps lock the wing members 17 in place in the assembled extended ramp device 10. As seen in FIGS. 2 and 3, the smaller wing end blocks 39 are at the lower end of each wing member 17. The wing end blocks 39 lock over the edge of the lower, extension portion 13 once it is in place. The base of the wing end block 39 is slightly higher on the wing member 17 than the base of the wing male block 40, since the wing male block 40 must fit closely into the ramp recess 41, and the smaller wing end block 39 fits over the thicker sides of the lower, extension portion 13. This staggering of the blocks 39, 40 is believed to convey superior rigidity to the ramp device 10.

Alternatively and less preferably, the base of the small wing end block 39 can be aligned with the base of the male block 40. In this alternative, the base of the wing end block 39 also fits into a ramp recess 41 in the lower extension portion 13, just as the male block 40 fits into the first ramp recess 41. This second ramp recess would be close to and below the first ramp recess 41, and similarly shaped.

The last two interior features of the wing members 17 are the two matching, substantially keyhole-shaped slots 28 in each wing member 17. Each wing member 17 preferably includes a same sized, generally rectangular-shaped substantially keyhole-shaped slot 28 in the two wide areas on the opposite ends of the wing member. The upper end section 29 of the substantially keyhole-shaped slot 28 is narrower than a lower, wider end section 30 of the substantially keyhole-shaped slot 28. Each male end connecting projection 31 on the brace members 14 comprises a narrow neck portion 32, and the neck portion 32 of each of the male end connection projections 31 extends into the narrower, upper end section 29 of the substantially keyhole-shaped slot 28 in the assembled extended ramp device 10. The wing member 17 is preferably molded so that its edges on the lower surface 20 of the wing member protrude farther into the slot on both sides of the narrower end portion 29 of the substantially keyhole-shaped slot 28, which provides the narrowing. The substantially keyhole-shaped slots 28 accommodate corresponding male end connecting projection 31 on the ends of the brace members 14. Each male end connecting projection 31 on the end of a brace member 14 is shaped so that it fits closely into a substantially keyhole-shaped slot 28. The width of the brace male end connecting projection 31 is preferably slightly less than the width of the slot opening. The length of the brace male end connecting projection 31 is preferably about equal to one half of the length of the substantially keyhole-shaped slot 28, which is about equal to the length of the wider and narrower end portions 30, 29. The wider and narrower end portions 30, 29 of the substantially keyhole-shaped slot 28, then, are preferably about equal in length. Each male end connecting projection 31 includes a narrower neck portion 32 that is adjacent the rest of the brace member 14.

During assembly, opposite brace male end connecting projections 31 of a brace member 14 are inserted into the wider end portions 30 of opposite substantially keyhole-shaped slots 28 in the front or rear of the wing members. The necks 32 of the male end connecting projections 31 on the opposite, short ends of the brace member 14 are then snapped into the narrower end portions 29 of the corresponding substantially keyhole-shaped slots 28 by pushing down evenly on the brace member 14. Once the brace member 14 is easily snapped in place, the neck 32 of each male end connecting projection 31 contacts, and is held in place by, the edges of the wing members 14 that extend into the substantially keyhole-shaped slot 28 in the narrower end portion 29 of the substantially keyhole-shaped slot. The other brace member 14 is then snapped into place in the front or rear of the wing members using the same procedure. Not much pressure is required to lock the brace members 14 into place.

The brace members 14 are preferably identical to one another, which facilitates manufacture and assembly. In the assembled position, the weight bearing brace members 14 prevent the wing members 17 from folding out, or buckling, even when the extended ramp device 10 is under stress from the weight of the animal. Like the wing member, each brace member 14 is arch shaped. In addition to its arched lower edge 34, each brace member 14 includes a substantially straight upper edge 33, and two opposite ends 34 between the upper and lower arched edges 33, 34. One or both brace members 14 of the assembled ramp device 10 extend down into the water when the device is in use. The arched lower edges 34 of the brace members have been found herein to stabilize the extended ramp device 10 in the water.

Figure 4:
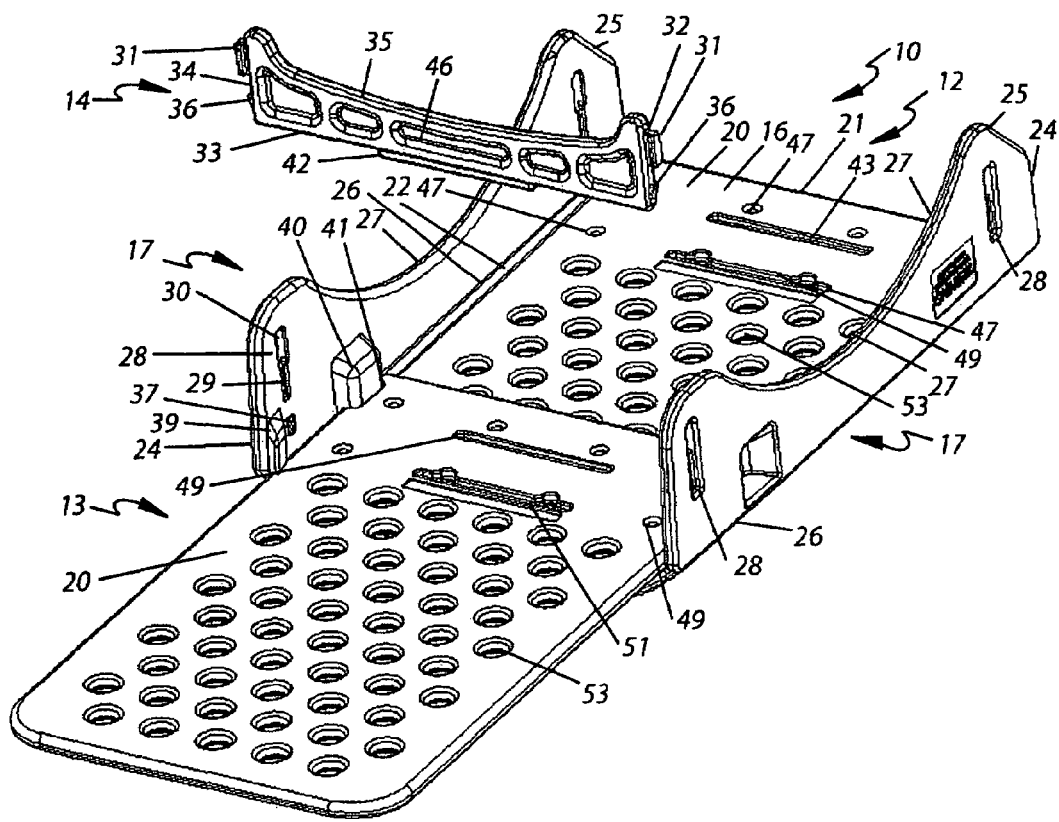
FIG. 4 is a bottom perspective view of a partially assembled extended ramp device according to the present invention.

A male end connecting projection 31 extends from each end 34 of the brace members 14, as seen in FIGS. 2, 4, and 5. Above the male end connecting projection 31 on each end of the brace member 14 is a smaller male stabilizing member 36, which corresponds to a female recess 37 on the wing member 17. Each brace member 14 preferably includes two same-sized brace male stabilizing members 36. Each brace male stabilizing member 36 is aligned with and below one of the substantially keyhole-shaped slots 28, so that it is closer to the central, climbing member 16.

When the extended ramp device 10 is being assembled, the brace male stabilizing members 36 snap into the correspondingly sized brace female recesses 37 as the brace members 14 are pushed down into place on the bottom of the ramp device 10. The brace male stabilizing members are preferably shaped substantially like a right triangle as seen in FIG. 2, with the base 44 of the right triangle shaped male stabilizing member 36 adjacent the male end connecting projection 31. As the brace member 14 is lightly pushed down during assembly, the angled side 45 of the right triangle shaped male stabilizing member 36 slides along the lower surface of the wing member 17 and snaps into place once it reaches the female recess 37. The substantially planar base 44 of the right triangle shaped male stabilizing member 36 prevents the brace member 14 from backing out of the female recess 37 on each wing member 17. Despite their small size, it has been found herein that the male stabilizing members 36 also help to stabilize the extended ramp device 10 by preventing the brace members 14 from twisting under the stress of a heavy animal mounting the ramp device.

In addition to the two types of male projections 31, 36 on the ends of the brace members 14, each brace member 14 includes an upper edge projection 42 that extends out along a central portion of the upper edge 33 of the brace member 14, as seen in FIGS. 2, 4, and 5. (It is called the brace "upper" edge because it faces up when the extended ramp device is assembled and is floating in the water.) The brace projections 31, 36, 42 and corresponding recesses and grooves can be various sizes and shapes, as desired. The upper edge projection 42 on the front brace member 14 fits into a correspondingly sized first locking groove 43 in the lower surface 20 of the central, climbing member 16 of the upper, support portion 12. The first locking groove 43 extends substantially perpendicular to a longitudinal axis of the wing member 17. When the brace member 14 is pushed down, the brace male end connecting projections 31 move into the narrower end portions 29 of the substantially keyhole-shaped slots 28, the brace male stabilizing members 36 snap into the wing female recesses 37, and the brace upper edge projection 42 fits into the corresponding first locking groove 43 in the lower surface 20 of the central climbing member 16.

The rear brace member 14 fits into a similarly sized, second locking groove 51 in the lower surface 20 of the lower, extension portion 13. The first locking groove 43 is adjacent and above the second locking groove 51 in both portions 12, 13 (upper and lower). For ease of manufacture and assembly, the brace members 14 are preferably duplicates of one another, and either one can be used as the front or rear brace member.

For ease of manufacture, the central, climbing member 16 is preferably substantially a duplicate of the lower, extension portion 13, so that the same mold can be used to manufacture them both. The lower, extension portion 13 therefore has several "nonfunctional" formations 49, such as indentations, holes, and grooves, which are not intended to be used. As seen in FIG. 4, the first and second locking grooves 43, 51, for example, are molded in both the upper and lower portions 12, 13. In the upper, support portion 12, the second locking groove 51 is a nonfunctional formation 49. In the lower, extension portion 13, the first locking groove 43 is nonfunctional 49. The rear brace member 14 is placed in the second locking groove 51 in the lower, extension portion 13, as seen in FIG. 5. The front one of the brace members 14 is placed in the first locking groove 43 in the upper, support portion 12.

The similarly sized, second locking groove 51 on the lower surface 20 of the central, climbing member 16 is below and substantially parallel to the first locking groove 43. The first and second locking grooves 43, 51 are preferably substantially rectangular in shape and correspond in size to the brace upper edge projection 42. They extend transversely across the lower surface 20 of the climbing member 16 and the lower, extension portion. As seen in FIGS. 3 and 4, the second locking groove 51 includes two cutouts along its front edge. Each cutout borders a small, circular aperture 47 from among a second row of small apertures on the central, climbing member 16. A device attachment mechanism 15, which preferably includes a waterproof rope, is insertable through the rope apertures 47 as seen in FIG. 1. The word "rope" is meant to include cable or the like. The device attachment mechanism 15 preferably tethers the extended ramp device 10 to land, a boat, or the like, but permits the ramp device to float in the water as described herein. This feature is useful for attachment of the extended ramp device 10 to a pool or the like that has a cove. The second locking groove 51 is farther back on the extended ramp device 10 than the first, front row 48 of apertures in order to facilitate attachment of the rope 50 or the like to the overhang (cove). If desired, an instruction such as "tie rope here for pools with cove" can be printed in a rectangular-shaped space below the groove (see FIG. 3).

The rope 50, cable, or the like may alternatively be threaded through same sized, rope apertures 47 in the first row of apertures 48. The fastening mechanism 15 preferably further comprises washers and brackets 52 for attachment to the pool deck next to the pool, in-ground tub, or the like, as depicted in FIG. 1.

The brace members 14 preferably include a number of interior depressions 46. Five depressions 46 are shown on each side of each brace members 14 of FIGS. 2, 4, and 5, for example. The depressions 46 within the interior of the brace members are believed to make the brace members 14 lighter in weight, stronger, and more rigid. The interior depressions 46 also lower manufacturing costs by decreasing the amount of material used to make the extended ramp device.

The one-piece lower, extension portion 13 is preferably made similarly to and of the same material as the upper, support portion 12. Like the central, climbing member 16, the lower, extension portion 13 includes a number of larger perforations 53 that extend through the central, climbing member 16 and the lower, extension portion 13. These "toehold perforations" 53 are larger in that they preferably have a greater diameter than the smaller apertures 47 for the device fastening mechanism 15, as seen in the figures. The toehold perforations 53 are most preferably same sized, circular-shaped, spaced apart, and in rows. The toehold circular perforations 53 provide toeholds, or pad or claw holds, for animals with toes or claws to grasp as the animal climbs the ramp device 10.

As seen in FIGS. 1 and 2, two parallel traction channels 54 preferably extend between pairs of toehold perforations 53 on the upper surface 19 of the central, climbing member 16 and lower, extension portion 13. These short traction channels 54 border small areas 55 between traction channels 54, which are preferably substantially rectangular shaped. It has been found herein that this surface structure, with its numerous toehold perforations 53, traction channels 54, and substantially rectangular shaped areas 55 between traction channels 54, provides a rougher, greater surface area that is easier for an animal with or without claws to climb than a flat wet surface.

Continuing with FIG. 2, the upper surface 19 of the upper, support portion 12 preferably also includes a substantially uninterrupted and straight traction channel 56 between each set of rows of perforations 53. These long traction channels 56 extend from side to side across the upper, support portion 12 and the lower, extension portion 13. They are believed to increase the animal's traction on the wet ramp device 10, thus helping many kinds of animals to climb the ramp device 10. The upper surface 19 of the upper and lower portions 12, 13 may be roughened, sprayed, or otherwise textured to improve traction to aid the escaping animal.

The term "small animal" herein is meant to include pets, such as cats and dogs, from small to large, but not what a veterinarian might consider a large animal, such as a cow or a horse. The term is also meant to include wild animals that weigh less than about two or three hundred pounds, such as rats, snakes, lizards, frogs, mice, rabbits, and raccoons, as well as feral cats and dogs.

Referring to FIGS. 3 through 5, the following steps are preferably taken to assemble the extended ramp device 10.

1) With the upper, support portion 12 lying on its upper surface 19, an upper end portion of the lower extension portion 13 is placed over a lower end portion of the upper, support portion 12 of the ramp device. Thus, the upper and lower portions 12, 13 overlap. The upper surface 19 of the lower extension portion 13 contacts the lower surface 20 of the upper, support portion 12.
2) With the upper, support portion 12 lying on its upper surface 19 for assembly, the wing members 17 are bent up, as seen in FIG. 3. The bases of the two wing male blocks 40 extend into the corresponding ramp recesses 41. The bases of the smaller wing end blocks 39 rest on the lower surface 20 at the edges of the lower, extension portion 13. The wing members 17 face in a generally downward direction when the extended ramp device 10 is deployed in the water.
3) A brace member 14 is aligned over the midsection of the extended ramp device, as shown in FIG. 4. Opposite male end connecting projections 31 of this rear brace member 14 are inserted into the wider end portions 30 of corresponding substantially keyhole-shaped slots 28 in the rear portions of the two wing members 14. The rear brace member 14 is pushed down evenly, which snaps the male end connecting projections 31 into the narrower end portions 29 of the substantially keyhole-shaped slots 28, and the brace upper edge projection 42 into the corresponding first locking groove 43 in the central, climbing member 16. At the same time, the brace male stabilizing members 36 below the male end connecting projections 31 on the brace member 14 snap into the correspondingly sized brace female recesses 37 in the wing members 17.
4) The other brace member 14 is aligned over a top portion of the extended ramp device, as seen in FIG. 5. Opposite male end connecting projections 31 of the other, front brace member 14 are inserted into the wider end portions 30 of corresponding substantially keyhole-shaped slots 28 in the front portions of the two wing members 14. The front brace member 14 is then pushed down, which snaps the male end connecting projections 31 into the narrower end portions 29 of the substantially keyhole-shaped slots 28, and the brace upper edge projection 42 into the corresponding first locking groove 43 in the central climbing member 16. At the same time, the brace male stabilizing members 36 below the male end connecting projections 31 on the brace member snap into the correspondingly sized brace female recesses 37 in the wing members 17. Once both brace members 14 are snapped down, the wing members 17 are both locked in place at about an 85 degree angle in relation to the central climbing member 16.
5) The selected device fastening mechanism 1S is fastened to the small apertures 47 in the first or second row in the front area of the central, climbing member 16. Steps 3, 4, and 5 need not be done in the above-described order. The assembled ramp device 10 is seen in FIG. 1.

Figure 6:
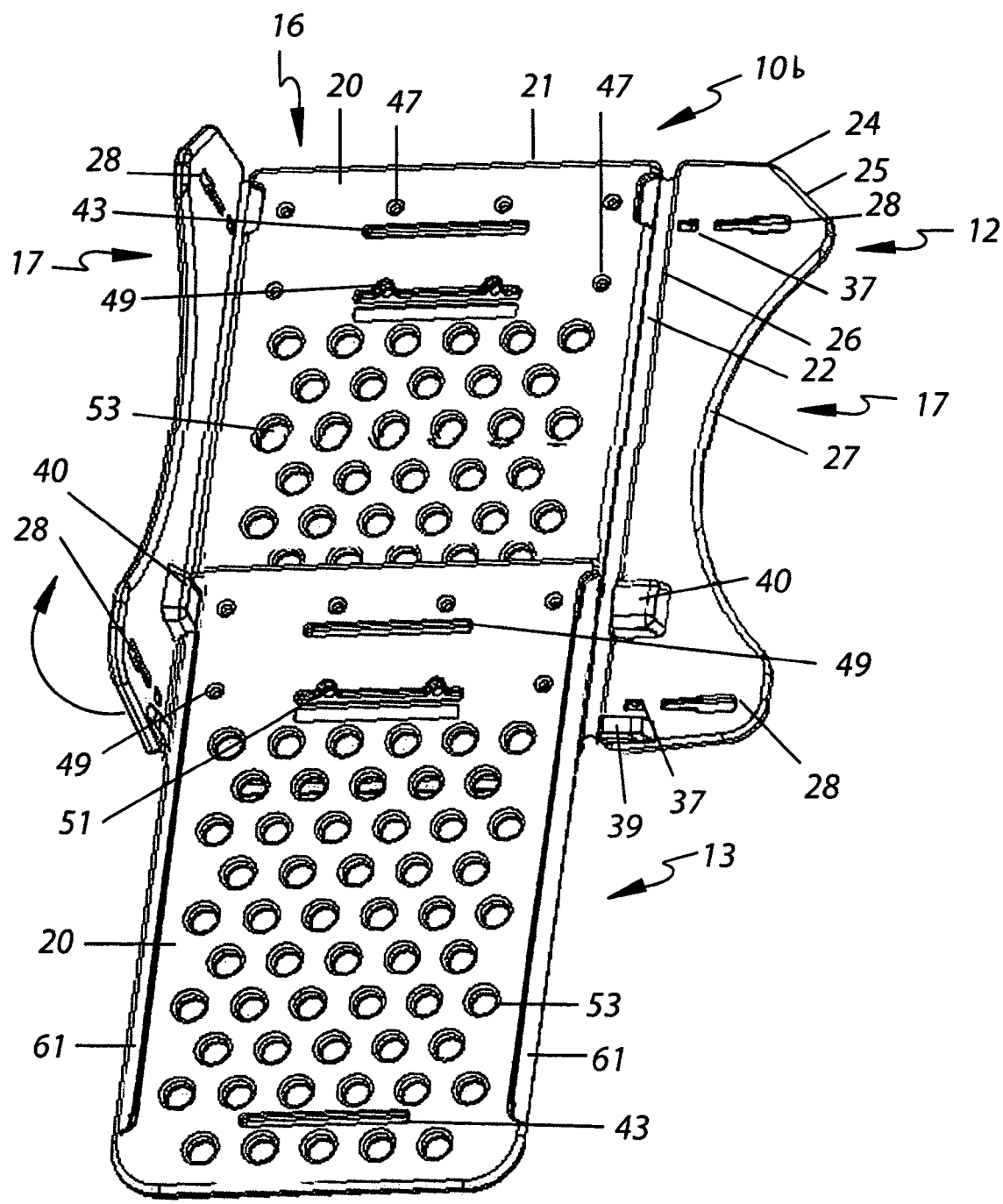
FIG. 6 is a perspective view of a collapsible, partially assembled ramp device according to the present invention, showing the bottom of the ramp device.

In the collapsible extended ramp device 10b illustrated in FIG. 6, the lower, extension portion 13 of the ramp device 10b slides neatly under the upper, support portion 12 and locks for transport or storage. If desired, the collapsible extended ramp device 10b can be used in the collapsed position for helping lighter weight animals to escape a body of water.

The lower extension portion 13 of the collapsible ramp device 10b includes two matching ramp guideways 61 on opposite long sides of the lower surface 20 of the lower extension portion. The width of the ramp guideway 61, which is a thin side edge, is slightly greater than the width of the wing male block 40 so that the base of the wing male block 40 fits closely into it. The thickness of the side edge guideway 61 is preferably about half the thickness of the lower extension portion 13. The base of the wing end block 39 also fits in the ramp guideway 61, so the width of the wing end block 39 is about the same as the width of the wing male block 40.

Each ramp guideway 61 extends along the side edge, but ends before the opposite ends of the lower extension portion 13. The thickness of these end sections is the same as the thickness of the rest of the lower extension portion 13. These thicker end sections at the opposite ends of the ramp guideways help prevent the lower extension portion from sliding off the upper support portion 12. The wing male blocks 40 and wing end blocks 39 also help to prevent the lower, extension portion 13 from becoming misaligned.

The central, climbing portion 16 can be a duplicate of the lower, extension portion 13, which affords manufacturing cost savings. In that case, the wing members 60 are attached to the guideways 61 in the upper, support portion 12. The guideways 61 in the lower, extension portion 13 can be used to collapse the lower, extension portion 13 over the upper, support portion 12 as described herein. Thus, the separate wing ramp device 10*d* is optionally collapsible. As seen in FIG. 6, the central, climbing member 16 is alternatively not be a duplicate of the lower, extension portion 13. The ramp recesses 41 in the central, climbing member 16 in FIG. 6 are nonfunctional 49; no wing male blocks 40 fit into them.

To collapse the collapsible ramp device 10*b*, the user lifts up the rear brace member 14, so that the brace upper edge projection 42 lifts out of the second locking groove 51 and the rear brace member 14 is unlocked. The lower extension portion 13 is then pushed over the upper, support portion 12, so that the upper surface 19 of the lower extension portion 13 slides along on the lower surface 20 of the upper, support portion 12. As it slides, the bottom of the wing male block 40 slides along in the ramp guideway 61 on each side of the lower extension portion 13. The lower extension portion 13 is pushed until its top edge is at the first locking groove 43. At this point, the male block 40 is at the end of the ramp guideway 61 on each side, and most of the lower extension portion 13 overlaps the upper, support portion 12. To prevent the lower extension portion 13 from inadvertently sliding back down to its original position, the rear brace member 14 is pushed down until the brace upper edge projection 42 locks into the second first locking groove 43 at the bottom section of the lower extension portion 13 in the lower surface 20 of the lower, extension portion 13. These steps are reversed to move the ramp device 10*b* from the collapsed position back to the extended position where the lower extension portion is extended.

Figure 7A:
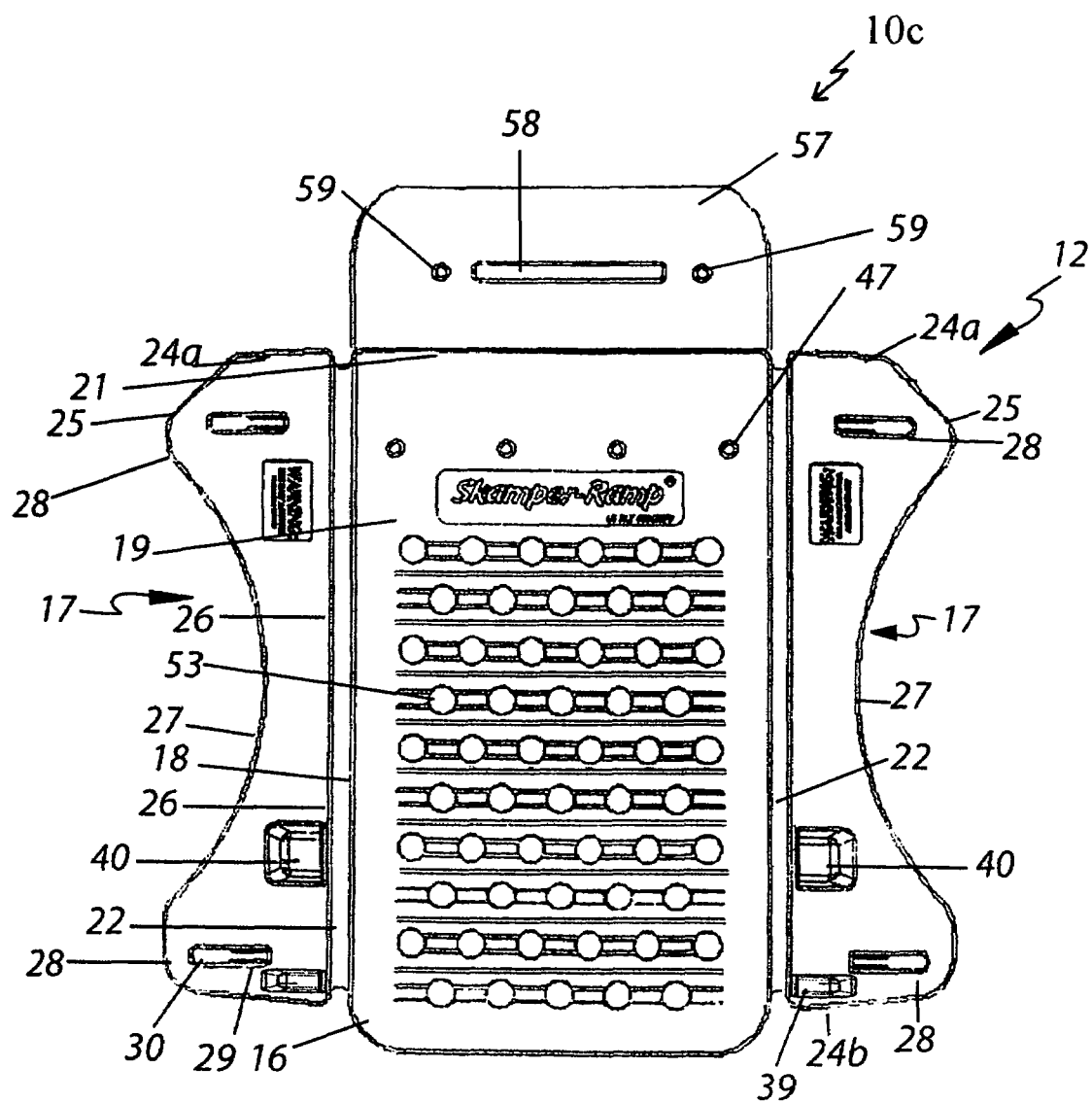
FIGS. 7 and 7b are elevational views of an unassembled ramp device with a bib according to the present invention, showing the top of the ramp device.
Figure 7B:
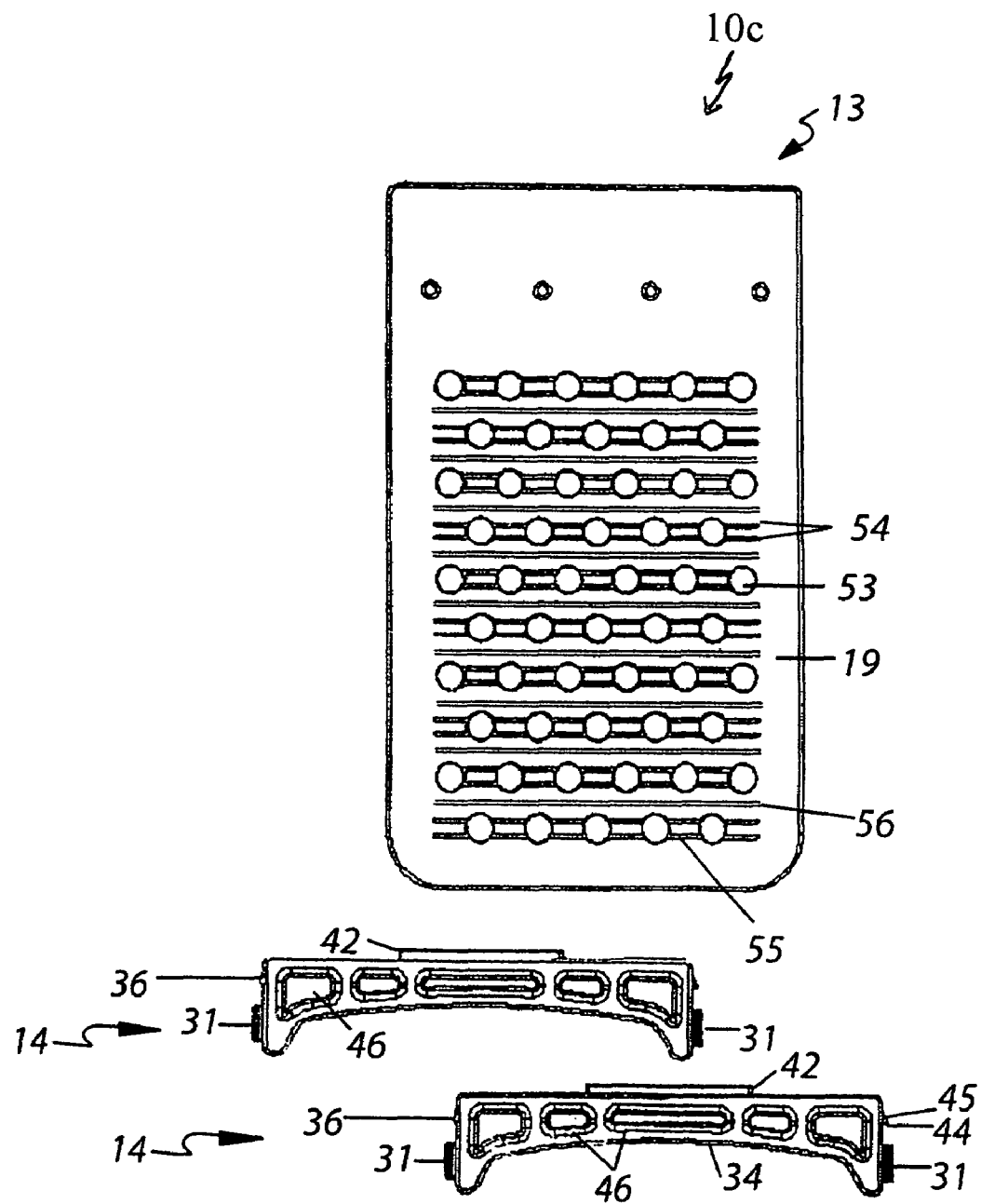
Figure 10:
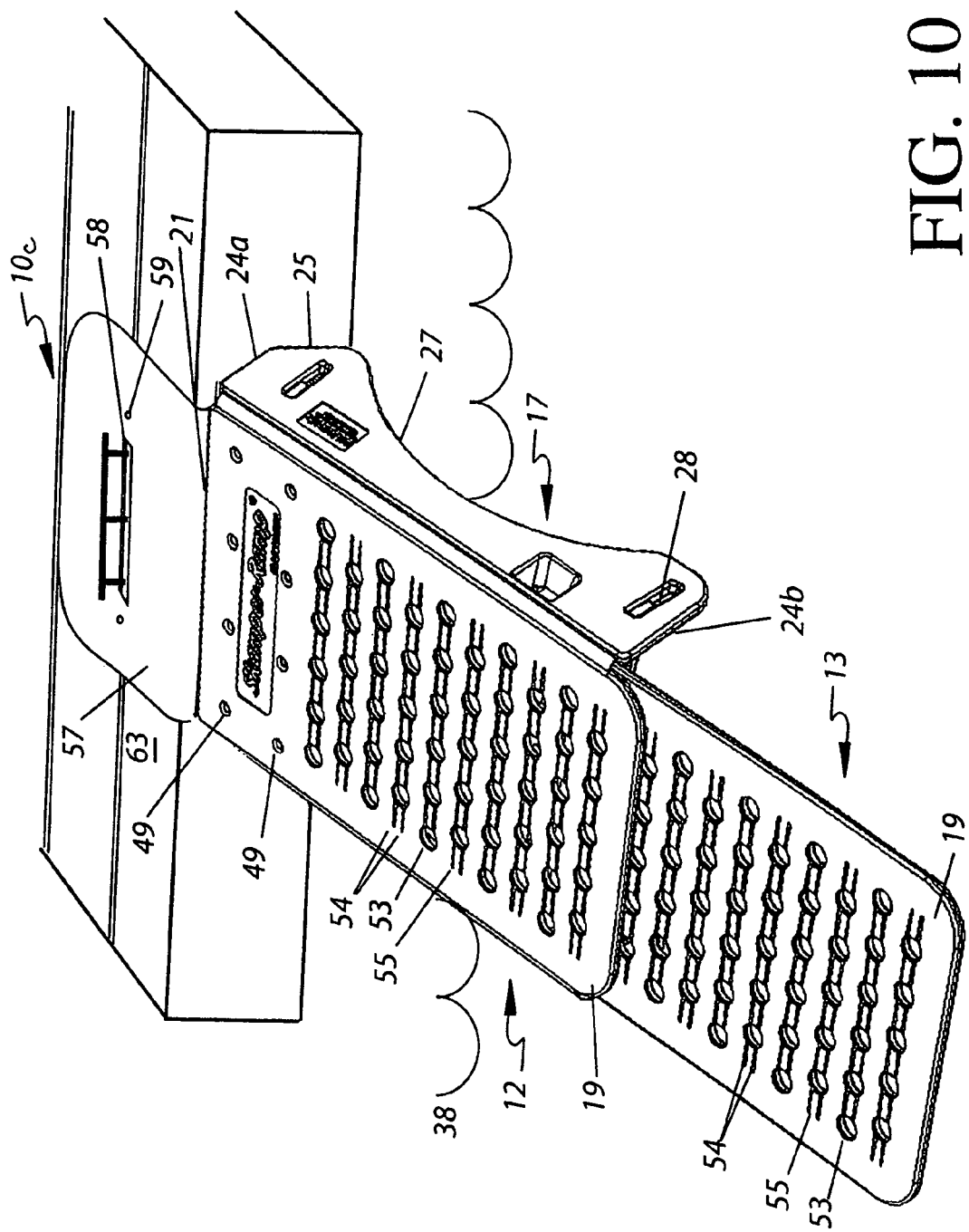
FIG. 10 is a top perspective view of an assembled, bibbed extended ramp device according to the present invention, shown by a dock.

Turning to FIGS. 7*a*, 7*b*, and 10, a bibbed extended ramp device 10*c* includes a bib 57 for suspending the extended ramp device from a cleat or brackets on a dock, boat, etc. In FIG. 10, the assembled extended ramp device 10*c* is shown attached to a cleat on a dock 63.

The disassembled ramp device 10*c* includes an upper, support portion 12 with the bib 57 at its upper end, as shown in FIG. 7*a*, as well as a lower extension portion 13 and two brace members 14, which are shown in FIG. 7*b*. The tongue-shaped bib 57 can be folded under the central climbing member 16 for transportation or storage, if desired. The upper, support portion 12, the lower extension portion 13, and two identical brace members 14 fit compactly into a box for transport. The extended ramp device 10*c* is assembled as described herein. The bib 57 is a flexible piece of plastic or other suitable material that is affixed at one end to the upper edge 21 of the central, climbing member 16. The bib 57 is preferably blow molded along with the reminder of the upper, support portion 12, although the upper, support portion 12 is significantly thicker than the flexible bib. The flexible bib 57 is not hinged to the upper, support portion 12. It is not made of wood or a stiff material. The bib 57 comprises a centrally located bib slot 58 for accommodating an existing cleat, and preferably a bib hole 59 near each opposite end of the substantially rectangular- shaped bib slot 58. The substantially rectangular-shaped bib slot 58 has a width and length sufficient for a cleat to pass through, and two holes adjacent opposite ends of the slot. In FIG. 10, the flexible bib 57 is draped over a cleat on a dock 63, with the cleat extending through the bib slot 58.

To attach the assembled, bibbed ramp device 10*c* to a side of a dock 63, boat, or other structure adjacent or on the body of water, the bib slot 58 is dropped down over the cleat, as seen in FIG. 10, and the rest of the extended ramp device is dropped into the water. The user need not enter the water to place the extended ramp device 10, and need not attend the extended ramp device, since animals can utilize the ramp device unassisted. Screws or brackets can be placed through the bib holes 59 into a dock, ramp, platform, etc. adjacent the body of water instead of, or in addition to, placing the bib slot 58 over a cleat.

Alternatively, the flexible bib 57 can be folded down and a rope 50 or the like can be utilized instead to hold the ramp device at the dock, if desired. To do so, the rope 50 is inserted through one or more of the small apertures 47 and through the bib hole 59, which functions to hold the bib 57 down out of the way. The bibbed ramp device may have one row of rope holes 47 in the upper support portion 12, as seen in FIG. 7*a*, or two rows of holes 47. The row of rope holes 47 in the lower extension portion FIG. 7*b* is nonfunctional; no rope is extended through them. The small holes in the lower, extension portion 13, which are nonfunctional, are only present because the same mold is preferably used for making both the central, climbing member 16 and the lower, extension portion 13.

The bibbed extended ramp device 10*c* preferably floats at between about a 20 and about a 60 degree angle in the water, as seen in FIG. 10. The angle of float repose is more preferably between about 30 and about 50 degrees, and is most preferably about a 45 degree angle. Since the bib 57 is flexible, the upper edge 21 of the central, climbing member 16 need not contact the side of the dock 63 as the ramp device floats in the water. When an animal such as a dog or cat first mounts the lower, extension portion 13, the wing angled side edges 25 are pushed against the side of the dock 63. The contact between the wing angled side edges 25 and the dock helps to stabilize the bibbed ramp device and maintain it at the more preferred 30-50 degree angle in the water. The flexible bib 57 prevents the bibbed ramp device 10*c* from being pushed away from the dock, boat, etc., although the bib is flexible enough to allow the extended ramp device 10*c* to bob in the water.

Figure 8:
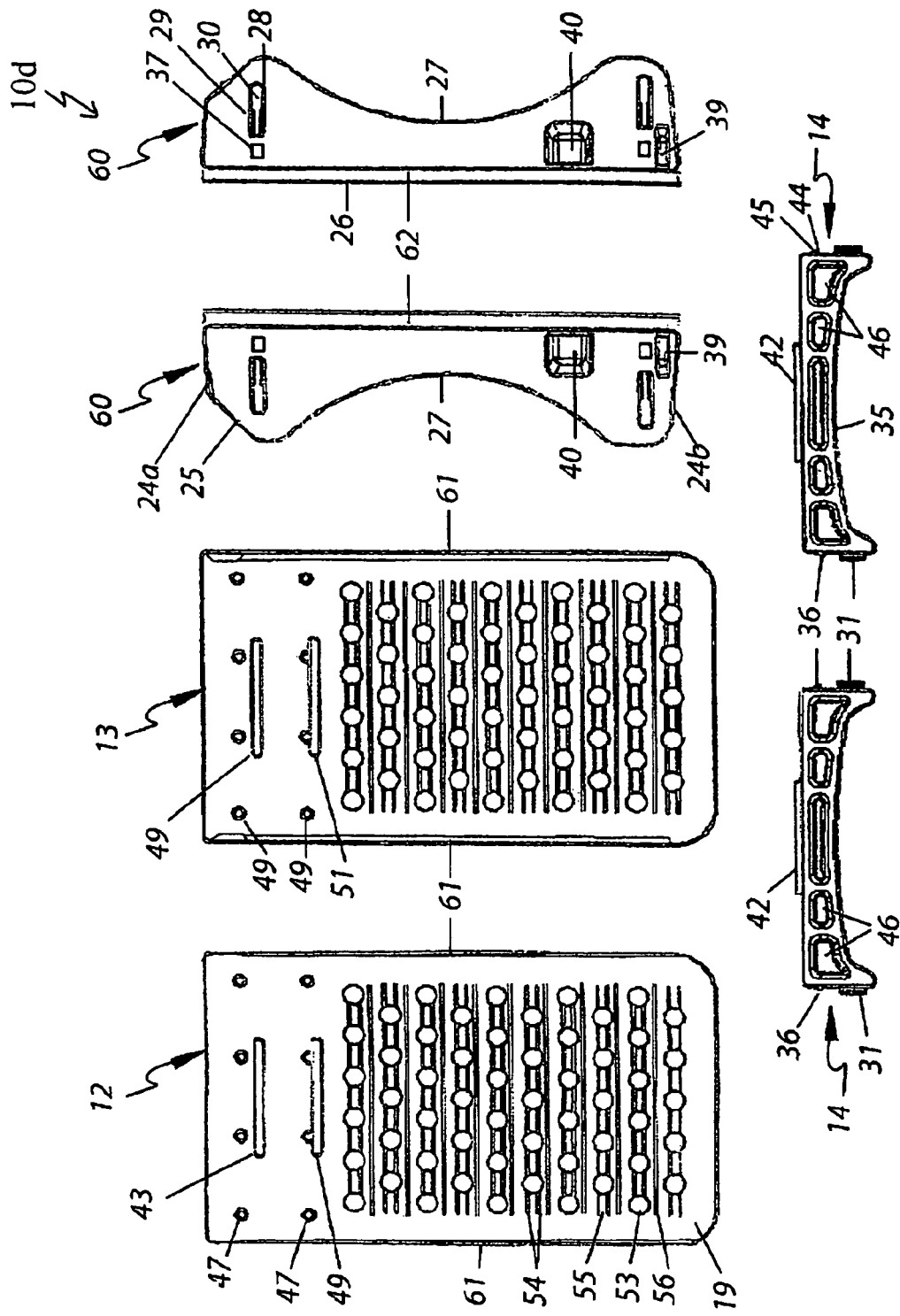
FIG. 8 is an elevational view of an unassembled ramp device having separate wing members according to the present invention, showing the top of the ramp device.
Figure 9:
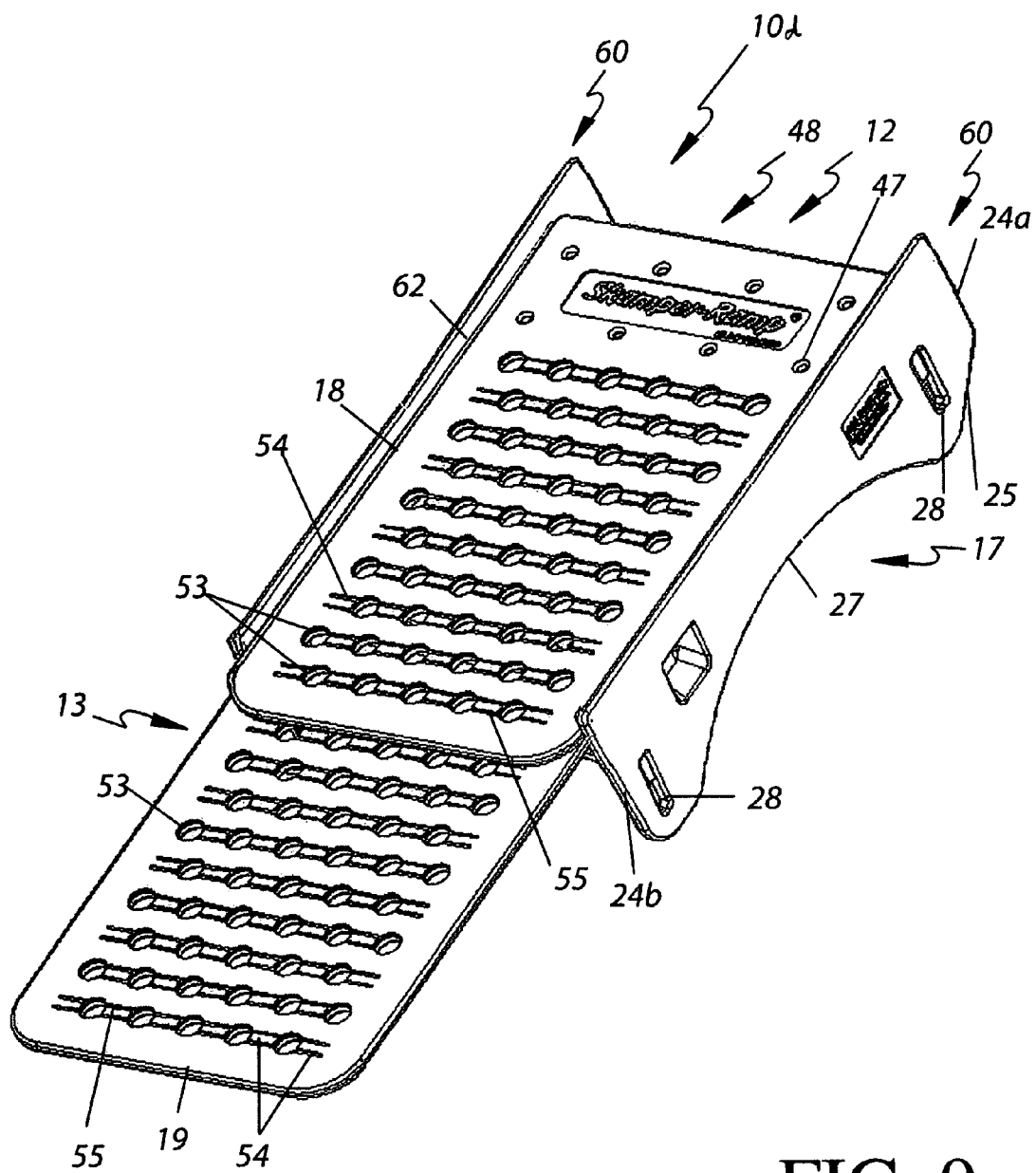
FIG. 9 is a top perspective view of an assembled separate wing ramp device according to the present invention.

In the separate winged extended ramp device 10*d* shown in FIGS. 8 and 9, the wing members 17 are separate from the upper, support portion 12. In the disassembled position, the ramp device 10*c* is in six pieces as seen in FIG. 8. The six pieces fit compactly into a box for shipping and storage. The six pieces are: the upper, support portion 12, lower extension portion 13, two matching wing members 60, and two matching brace members 14.

As seen in FIG. 8, each wing member 60 includes a wing gutter 62 along its upper edge. The curved wing gutter 62 extends the length of the wing member 60. Each wing gutter 62 fits over a ramp guideway 61 in the assembled extended ramp device 10*d* seen in FIG. 9. The wing gutter 62 is preferably C-shaped in cross section, so that the wing gutter 62 clasps the ramp guideway 61. The wing gutter 62 can be snapped over the ramp guideway 61, or the wing member 60 can be placed at the front end of the central climbing portion 16 and the wing gutter 62 slides down over the ramp guideway 61. The wing members 60 preferably also include the four interior wing features: two blocks 39, 40 and two slots 28 on each wing member 60, as described herein and illustrated in FIGS. 8 and 9. In the assembled ramp device 10*d*, the bases of the wing male block 40 and the wing end block 39 extend down onto the ramp guideway 61.

To assemble the separate wing ramp device 10*d*, the following steps are taken.

1) With the upper, support portion 12 lying on its upper surface 19, an upper end portion of the lower extension portion 13 is placed over a lower end portion of the upper, support portion 12 of the ramp device. The upper surface 19 of the lower extension portion 13 contacts the lower surface 20 of the upper, support portion 12.

2) With the upper, support portion 12 lying on its upper surface 19 for assembly, the gutters 62 of the wing members 60 are clasped over the ramp guideways 61, as seen in FIG. 9. The bases of the wing male blocks 40 extend into corresponding ramp recesses 41. The bases of the smaller wing end blocks 39 rest on the lower surface 20 at the edges of the lower, extension portion 13. In the assembled ramp device, the wing members 60 face in a generally downward direction when the extended ramp device 10 is deployed in the water.

3) Opposite male end connecting projections 31 of the rear brace member 14 are inserted into the wider end portions 30 of corresponding substantially keyhole-shaped slots 28 in the rear portions of the two wing members 14. The rear brace member 14 is pushed down evenly, which snaps the male end connecting projections 31 into the narrower end portions 29 of the substantially keyhole-shaped slots 28, and the brace upper edge projection 42 into the corresponding first locking groove 43 in the central, climbing member 16. At the same time, the brace male stabilizing members 36 below the male end connecting projections 31 on the brace member 14 snap into the correspondingly sized brace female recesses 37 in the wing members 17.

4) The other brace member 14 is brought to a top portion of the extended ramp device. Opposite male end connecting projections 31 of the other, front brace member 14 are inserted into the wider end portions 30 of corresponding substantially keyhole-shaped slots 28 in the front portions of the two wing members 14. The front brace member 14 is then pushed down, which snaps the male end connecting projections 31 into the narrower end portions 29 of the substantially keyhole-shaped slots 28, and the brace upper edge projection 42 into the corresponding first locking groove 43 in the central climbing member 16. At the same time, the brace male stabilizing members 36 below the male end connecting projections 31 on the brace member snap into the correspondingly sized brace female recesses 37 in the wing members 17. Once both brace members 14 are snapped down, the wing members 17 are both locked in place at about an 85 degree angle in relation to the central climbing member 16. Steps 3 and 4 can be done in reverse order. The assembled ramp device 10*d* is seen in FIG. 9.

From the foregoing it can be realized that the described device of the present invention may be easily and conveniently utilized as an extended ramp device for helping small animals to escape from a body of water. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS

10 extended ramp device
11 small animal
12 upper, support portion
13 lower, extension portion
14 brace members
15 device fastening mechanism
16 central, climbing member
17 wing members
18 long sides of central member
19 upper surface
20 lower surface
21 upper edge of central member
22 flexible strip
23 wall of pool or other structure
24 wing end edge
25 wing angled side edges
26 wing upper edge
27 arched wing lower edge
28 wing substantially keyhole-shaped slots
29 narrower end portion of slot
30 wider end portion of slot
31 brace male end connecting projection
32 neck of male end connecting projection
33 brace substantially straight upper edge
34 end of brace member
35 brace arched lower edge
36 brace male stabilizing member
37 brace female recess
38 water's surface
39 wing end blocks
40 wing male blocks
41 ramp recess
42 brace upper edge projection
43 first locking groove
44 base of male stabilizing member
45 angled side of male stabilizing member
46 brace interior depressions
47 small apertures
48 first row of small apertures
49 nonfunctional formations
50 rope
51 second locking groove
52 fastening bracket
53 larger, toehold perforations
54 short traction channels between perforations
55 areas between channels
56 longer traction channels
57 flexible bib
58 bib slot
59 bib holes
60 separate wing members
61 ramp guideway 62 wing gutters
63 dock

What is claimed is:

1. An extended ramp device for assisting animals in escaping from a body of water, the extended device comprising:
   (a) a substantially planar upper, support portion comprising a central, climbing member and two wing members, each of the wing members being bendable along a substantially straight upper edge of the wing member, each of the wing members further comprising an arched lower edge opposite the substantially straight upper edge and at least two substantially keyhole-shaped slots, the flexible wing members being connected to opposite sides of the central climbing member, each of the wing members further comprising a substantially straight, angled side edge at a front of the wing member;
   (b) a substantially planar lower, extension portion, the upper, support portion and the lower, extension portion comprising a plurality of toehold perforations;
   (c) at least two brace members, each of the brace members comprising a male end connecting projection on each opposite end of the brace member, each of the brace male end connecting projections being insertable in the at least two substantially keyhole-shaped slots; and
   (d) a mechanism for removably attaching the extended ramp device to a structure adjacent or in the body of water;
   wherein the extended ramp device comprises a disassembled position comprising the separate (a)-(c) components, and an assembled position for use in the body of water.

2. The extended ramp device according to claim 1, wherein the central, climbing member is substantially the same in structure as the lower, extension portion, and each of the wing members is smaller in size than the central, climbing member, the wing members being a mirror image of one another.

3. The extended ramp device according to claim 1, wherein the wing members are each at an angle of between about 75 and about 90 degrees in relation to the transverse plane of the central, climbing member; and wherein the assembled extended ramp device floats at an angle of between about 30 and about 50 degrees when the extended ramp device is in the body of water.

4. The extended ramp device according to claim 1, wherein the angled side edge of each wing member extends down at between about a 30 and about a 45 degree angle relative to an upper edge of the central, climbing member.

5. The extended ramp device according to claim 1, wherein each of the wing members further comprises a front wing end edge that extends down at an angle of between about 85 and about 95 degrees relative to the upper edge of the wing member, an end of the front wing edge being connected to an end of the angled side edge.

6. The extended ramp device according to claim 1, wherein the central, climbing member is the same in structure as the lower, extension portion, each comprising a first locking groove substantially parallel to a second locking groove in each, each of the brace members comprising an upper edge projection that is inserted in a different one of the locking grooves in the assembled extended ramp device.

7. The extended ramp device according to claim 1, wherein each of the wing members comprises a flexible connecting strip along its substantially straight upper edge, each of the wing members being bendable along the flexible connecting strip, the flexible connecting strips connecting the flexible wing members to opposite sides of the central climbing member.

8. The extended ramp device according to claim 1, wherein the structure is a side wall of a pool with a cove, the mechanism for removably attaching the extended ramp device is a rope, the upper, support portion further comprises a plurality of rope apertures in at least two parallel rows, the rope being extended through at least one of the rope apertures in a rearmost one of the at least two rows of rope apertures.

9. The extended ramp device according to claim 1, wherein the wing members are each at an angle of between about 84 and about 86 degrees in relation to the plane of the central, climbing member.

10. The extended ramp device according to claim 1, wherein an upper end section of the substantially keyhole-shaped slot is narrower than a lower, wider end section of the substantially keyhole-shaped slot, each male end connecting projection on the brace members comprises a narrow neck portion, and the neck portion of each of the male end connection projections extends into the narrower, upper end section of the substantially keyhole-shaped slot in the assembled extended ramp device.

11. The extended ramp device according to claim 1, wherein the central, climbing member and the lower, extension portion each further comprise a plurality of traction channels extending between pairs of a plurality of toehold perforations on an upper surface of the central, climbing member and the lower, extension portion.

12. The extended ramp device according to claim 1, wherein the mechanism for removably attaching the extended ramp device to a structure adjacent or in the body of water is a flexible bib, the flexible bib comprising a central, substantially rectangular-shaped bib slot.

13. The extended ramp device according to claim 1, wherein each wing member further comprises a male block projecting from a lower surface of the wing member, and the lower, extension portion comprises a corresponding female ramp recess on each opposite, long side of the lower, extension portion, a base of the wing male block being insertable in the female ramp recess.

14. The extended ramp device according to claim 1, wherein each wing member further comprises an end block projecting from a lower surface of the wing member adjacent a lower end of the wing member, a base of each of the wing end blocks contacting a lower surface of the lower, extension portion adjacent a side edge of the lower extension portion in the assembled extended ramp device.

15. The extended ramp device according to claim 1, wherein the upper, support portion further comprises a flexible bib affixed at one end to the upper edge of the central, climbing member, the hingeless flexible bib comprising a central bib slot for accommodating a cleat on the structure that is adjacent to or in the body of water.

16. The extended ramp device according to claim 1, wherein the lower, extension portion further comprises a ramp guideway on each of the two opposite long sides of the lower surface of the lower, extension portion, and each wing member further comprises a wing male block projecting from a lower surface of the wing member, a base of the wing male block contacting the ramp guideway in the assembled extended ramp device, the lower, extension portion being slidable over the central, climbing member.

17. The extended ramp device according to claim 16, wherein the lower, extension portion further comprises a second first locking groove in a lower surface of the lower, extension portion in a bottom section of the lower, extension portion, and each of the brace members further comprises an upper edge projection, the brace upper edge projection being closely inserted in the second first locking groove when the extended ramp device is in a collapsed position.

18. The extended ramp device according to claim 17, wherein each ramp guideway extends along a major portion of the side edges of the lower extension portion, and ends before the opposite ends of the lower extension portion.

19. An extended ramp device for assisting animals in escaping from a body of water, the extended ramp device comprising:
   (a) a central, climbing member comprising a plurality of toehold perforations;
   (b) two matching wing members, each of the wing members comprising a wing gutter along a substantially straight wing upper edge, an arched lower edge opposite the substantially straight wing upper edge, a substantially straight, angled side edge at a front of the wing member, and at least two substantially keyhole-shaped slots;
   (c) a substantially planar lower, extension portion comprising a plurality of toehold perforations, the lower, extension portion comprising a ramp guideway on each of the two opposite long sides of the lower surface of the lower, extension portion;
   (d) at least two interchangeable brace members, each of the brace members comprising a male end connecting projection on each opposite end of the brace member, each of the brace male end connecting projections being insertable in the at least two substantially keyhole-shaped slots; and
   (e) a mechanism for removably attaching the extended ramp device to a structure adjacent or in the body of water;
   wherein each of the ramp guideways is inserted in one of the wing gutters.

20. The extended ramp device according to claim 19, wherein each wing member further comprises a male block projecting from a lower surface of the wing member, a base of the wing male block being insertable in the ramp guideway.

* * * * *